3,512,987
CHILLPROOFING OF BEER
Ralph A. Messing, Horseheads, N.Y., assignor to Corning Glass Works, Corning, N.Y., a corporation of New York
No Drawing. Filed Apr. 24, 1967, Ser. No. 632,903
Int. Cl. C12h 1/02
U.S. Cl. 99—48        7 Claims

ABSTRACT OF THE DISCLOSURE

The chill stability of beer is enhanced by the addition thereto of a porous glass chillproofing agent.

---

The term "beer" as used herein is broadly defined as an alcoholic beverage made by fermentation of a farinaceous extract and includes all beers, ales and the like.

The transformation of ripe barley grains into sparkling clear beer is a complicated art which has been passed down through generations. Beer production may be considered to involve the steps of mashing, fermenting, lagering and packaging. Briefly the brewing of beer starts with an aqueous extract, known as wort, which is prepared by mashing of malted cereals. The filtered wort is boiled together with hops to extract the flavor of the hops. Then insoluble hop constituents are strained from the wort and the liquor is cooled. Now yeast is added to the wort to ferment the sugary extract. After fermentation, the resulting beer is passed through various other operations, including cold storage, maturing, carbonation and filtration. It is during these brewing operations that the beer is stabilized by what is known in the art as "chillproofing."

The finished beer must be completely bright in appearance and chemically stable for many months under normal temperatures. Furthermore, the beer must not be hazy or turbid when stored in a refrigerator. It has been found that the turbidities formed in beer in the course of time or by chilling below room temperature are due primarily to complexes of proteins and tannins. Chill haze, although it is mostly reversible and will disappear when the beer is warmed, is not acceptable to the consumer.

Heretofore several methods have been used to chillproof beer. In the U.S. most breweries add proteolytic enzymes, such as bacterial proteases or papain, to convert and breakdown the proteins of high molecular weight, which are believed to be part of the haze-forming protein-tanning complex, to peptides and amino acids. Where all additions of foreign substances to the beer that go into solution are undesirable or prohibited, clays such as bentonite have been employed to adsorb the deleterious proteinaceous substances. The removal of the tannins which form part of the complex has also been tried by the addition of finely ground nylon or Perlon powder which is mixed with the beer and after some time separated along with the adsorbed tannins. Each of these methods approach the problem separately, either by hydrolysis of the protein or by adsorption of a portion of the protein-tannin complex. In order to effect hydrolysis and adsorption simultaneously it has been necessary to add to the beer both an enzyme and an adsorbent.

In accordance with the present invention, I have discovered a method of treating beer to prevent the formation of chill haze by adding to the fermented beer prior to the final filtration an effective amount of a porous glass chill-proofing agent, permitting the agent to remain in contact with the beer for a time and at temperature sufficient to adsorb and hydrolytically breakdown at least a portion of the high molecular weight protein molecules to peptides and amino acids, and then finally removing the porous glass agent The use of porous glass to chillproof beer has numerous advantages over the materials presently being used. Being inorganic and insoluble, it is easily removed from the beer. Porous glass appears to have two properties that contribute to a large extent to its chillproofing activity, namely, its ability to hydrolyze protein complexes and its ability to include and trap high molecular weight proteins by adsorption and diffusion. The active sites on the surface of the porous glass, boron and silanol groups, bind the proteins and tannins to the glass. As the protein molecule diffuses through the pores of the glass, it breaks down or hydrolyzes due to its retention on the active sites of the glass surface. The hydrolyzed products, lower molecular weight amino acids and peptides, do not participate in forming chill haze. Moreover, at least some of the remaining unhydrolyzed proteins, tannins, or protein-tannin complexes are trapped in or adsorbed on the surface of the pores due to induced charges from the boron sites and reaction with the silanol groups.

The porous glass chillproofing agent is prepared conventionally by heat treating special glasses to cause separation into acid-soluble phases and acid insoluble phases and then extracting the soluble phases. Such a procedure is set forth by H. P. Hood et al., U.S. Pat. No. 2,106,744 which describes in detail a method of making a porous glass composed of over 94% silica from an alkali borosilicate glass by thermally treating the glass to separate it into two phases, one rich in silica and the other composed essentially of non-siliceous constituents, and extracting the latter phase by leaching in dilute acid. This leaves a highly siliceous structure retaining its original shape and having a multiplicity of interconnecting, submicroscopic pores. Glasses resulting from such method are known in the art by the general designation "96% silica glasses" and this general designation is used herein with that meaning. Useful porous bodies obtained by conventional leaching with dilute acid typically have an average pore diameter of about 40 to 50 A.

The preferred porous glass material has a somewhat larger pore size of about 100 A. Particles of such porous glass can be prepared by the method of Chapman et al., Ser. No. 565,372, filed July 15, 1966, which involves enlarging the pore size of conventional porous glass by impregnating a porous glass body with an aqueous solution of a weakly reactive fluorine containing compound, reacting the compound in situ with a mineral acid to release hydrofluoric acid at a temperature sufficient to dissolve a portion of the glass body and washing the body to remove the soluble constituents. The starting material is essentially porous and may be prepared in accordance with the Hood et al. patent previously mentioned. A typical material, sold commercially by Corning Glass Works under Code 7930, has an average pore size of about 40 to 50 A. and is composed in weight percent on a dry basis of about 96% silica, 3% boric oxid, 0.2% alumina, and less than about 0.05% sodium oxide. Preferably, this material should be thoroughly dried such as by placing the material in an oven for a suitable period of time. The porous glass body is then impregnated with a solution of a weakly reactive fluorine containing compound, such as a 10% aqueous solution of ammonium bifluoride. Impregnation should be for a time sufficient to fill all the pores and the actual time depends to some extent upon the thickness and the configuration of the body. Generally, about five minutes for a one millimeter thick piece has been found sufficient. The temperature of impregnation should be relatively low and is preferably around room temperature.

Activation of the compound in situ to release hydrofluoric acid is performed with dilute mineral acid, such as dilute nitric acid, dilute sulfuric acid, or dilute hydrochloric acid, usually in concentrations of about 0.5 to 2 normal. After the acid treatment, the glass is washed to remove all traces of the soluble constituents which have been acted on by the acid. This is best accomplished by immersing the glass for several hours in pure running water at elevated temperatures so as to expose all sides of the article to the washing action. The removal of the soluble products leaves the silica phase as a rigid structure with the pores considerably enlarged. The porous glass may thereafter be dried and is suitable for use.

In general, the porous glass is used in particulate form having a particle size of about −80 to +230 mesh U.S. Standard size, but this is not critical. These particles should also generally have a pore size of 40–100 A. It is important that the beer be provided with ample opportunity to make contact with the porous glass chillproofing agent. Thus the surface area of the porous glass should be relatively large on the order of about 100 sq. meters per gram. The concentration of porous glass chillproofing agent added to the beer is generally in the range of 0.2–0.02 percent by weight of the beer and preferably about 0.04 percent. It was found that a large excess of the porous glass, for example even about 0.4 percent by weight was substantially less effective, while as small a concentration of 0.02 percent gave beneficial results.

Typically, according to my method a sample of unpasteurized fermented beer is filtered through diatomaceous earth to remove insolubles. Porous glass particles, prepared as herein described, are then added and the sample is stored at a temperature of about 1° C. to ambient temperatures for a period of about 1–4 days. During the polishing filtration, the porous glass is removed from the beer in a filter press using a precoat of diatomaceous earth or canvas. For recycling of the porous glass, it is recommended that the final filtration be performed through a canvas backed filter paper without using diatomaceous earth or alternatively the porous glass, which settles to the bottom of the treating vessel, can be removed by decantation with a pumping device located above the settled glass layer. After use the porous glass can be readily regenerated with a dilute alkali and/or acid treatment.

By way of further illustrating the invention and the manner in which it may be practiced, the following specific example is set forth.

Various concentrations of porous glass chillproofing agent prepared as described hereinabove having a pore size of 100 A., a surface area of about 100 sq. meters per gram, and a particle size of −80 to +230 mesh U.S. Standard sieve size were added to 250 milliliter aliquots of unpasteurized, filtered beer. In addition two other samples were prepared; a control to which nothing was added and a second sample to which a proteolytic enzyme preparation sold commercially under the trademark Chilko had been added in a convention amount. All the test samples were placed in a refrigerator at 4° C. for a period of 24 hours and then filtered cold through #3 Whatman paper. The filtered beer was placed in a water bath at 41° C. for three days and then returned to the refrigerator at 4° C. for a period of up to 21 days. The samples of beer were then compared and the results obtained are set forth in the table below.

CHILLPROOFING EFFECT AFTER 21 DAYS OF COLD STORAGE

| Agent | Concentration, percent | Quantity (g.) | pH | Clarity after chillproofing (in order of listing) |
|---|---|---|---|---|
| Porous glass | 0.04 | 0.1 | 4.22 | Clearest |
| Do | 0.2 | 0.5 | 4.19 | Do. |
| Do | 0.02 | 0.05 | 4.23 | Do |
| Enzyme | 0.3 | ¹ 0.75 | 4.28 | Do. |
| Porous glass | 0.4 | 1.0 | 4.16 | Do. |
| Control | | 0 | 4.26 | Cloudiest. |

¹ Ml.

After 21 days of cold storage, the results indicate that all of the samples containing the porous glass agent were substantially more stable to chill haze than the control. As a matter of fact samples containing the porous glass agent were even more effective than 0.3% Chilko (enzyme preparation). The optimum concentration in this experiment was found to be 0.04% porous glass, and with 0.2% porous glass being more effective than 0.02% porous glass and the least effective being the 0.4% porous glass. There appears to be little or no relation between chillproofing and the final pH of the beer. Although there was a 0.1 of a pH unit difference between the control and the sample containing the highest concentration of porous glass (0.4%), the optimum concentration for chillproofing (0.04%) displayed only a 0.04 unit drop in pH when compared to the control.

It will be appreciated that the invention is not limited to the specific details shown in the example and illustrations, and that various modifications may be made within the ordinary skill in the art without departing from the spirit and scope of the invention.

I claim:
1. A method of treating beer to prevent the formation of chill haze comprising the steps of:
   (a) adding to the fermented beer containing high molecular weight protein molecules an effective amount of particulate porous 96% silica glass chillproofining agent,
   (b) permitting the agent to remain in contact with the beer for a time and at a temperature sufficient to adsorb and hydrolytically breakdown at least a portion of the high molecular weight protein molecules to peptides and amino acids, and
   (c) then removing the porous glass agent.
2. The method of claim 1, wherein said porous glass agent has a pore size of 40–100 A.
3. The method of claim 1, wherein said porous glass agent is in particulate form having a particle size of −80 to +230 U.S. Standard sieve size.
4. The method of claim 1, wherein the amount of porous glass agent added is in the range of 0.02–0.2 percent by weight of the beer.
5. The method of claim 1, wherein the porous glass agent is regenerated and then added to another batch of fermented beer.
6. The method of claim 1, wherein the agent remains in contact with the beer for a time of 1–4 days and at a temperature of 1° C. to ambient temperature.
7. The method of claim 1, wherein to the fermented beer is added about 0.04 percent by weight of the porous glass agent having a particle size of 80–230 mesh U.S. Standard sieve, a pore size of about 100 A., and a surface area af about 100 sq. meters per gram, and the porous glass agent is permitted to remain in contact with the beer for a period of about 24 hours at a temperature of about 4° C.

References Cited

UNITED STATES PATENTS 2,663,745    12/1953    Wilson _____ 99—48 X
3,163,538    12/1964    Raible _____ 99—48

A. LOUIS MONACELL, Primary Examiner

D. M. NAFF, Assistant Examiner